E. P. Hudson, 2. Sheets. Sheet. 1.

Roasting Ores.

No. 4,132. Reissued Sept. 27. 1870

Witnesses:
H. J. Brown
R. S. Smith

Edward P. Hudson
By his Atty.,
J. S. Brown

N. PETERS, PHOTO-LITHOGRAPHER, WASHINGTON, D. C.

E. P. Hudson, 2. Sheets. Sheet. 2

Roasting Ores.

No. 4,132. Reissued Sept. 27. 1870.

Witnesses:-
H. J. Brown
R. D. Smith

Edward P. Hudson,
By his atty.,
L. S. Brown

N. PETERS, PHOTO-LITHOGRAPHER, WASHINGTON, D. C.

United States Patent Office.

EDWARD P. HUDSON, OF NEW YORK, N. Y., ASSIGNOR TO THE HUDSON ORE-REFINING COMPANY.

Letters Patent No. 78,456, dated June 2, 1868; reissue No. 4,132, dated September 27, 1870.

IMPROVEMENT IN FURNACES FOR ROASTING ORES.

The Schedule referred to in these Letters Patent and making part of the same

*To all whom it may concern:*

Be it known that I, EDWARD P. HUDSON, of New York, in the county and State of New York, have invented an Improved Furnace and Resulting Process for Roasting and Desulphurizing Ores; and I do hereby declare that the following is a full and exact description thereof, reference being had to the accompanying drawing making part of this specification—

Figure 1:
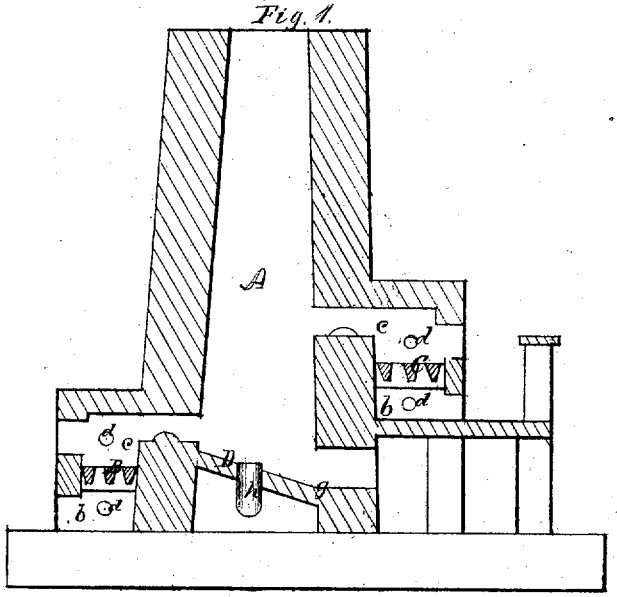
Figure 2:
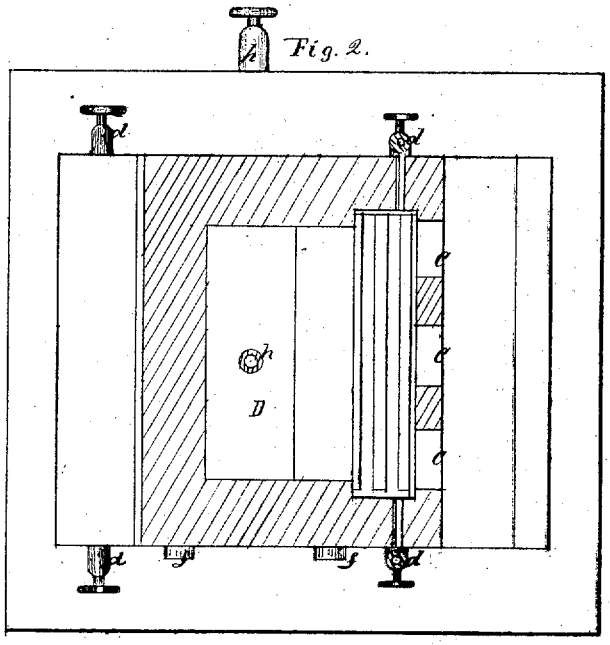
Figure 3:
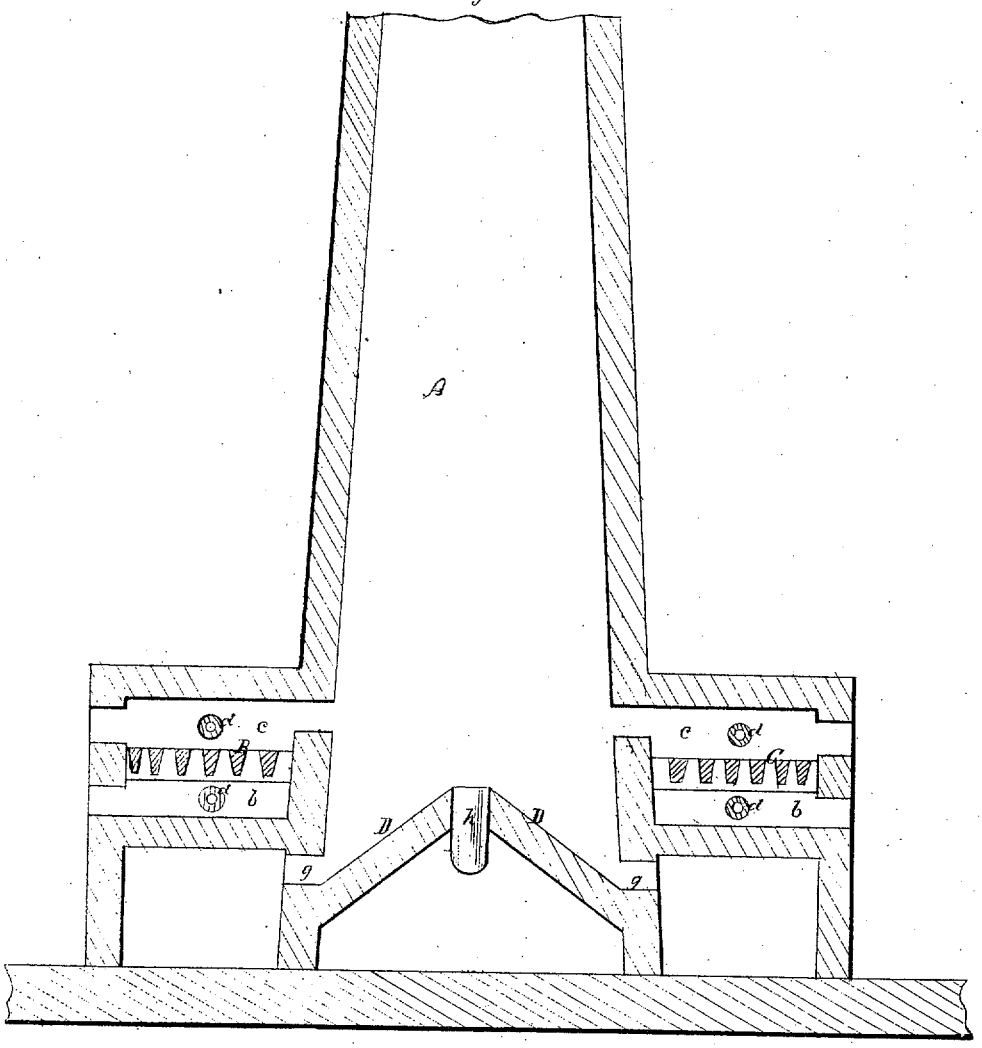

Figure 1 being a central vertical section of the furnace through the fire-chambers;

Figure 2, a horizontal section thereof, in a plane indicated by the line *x x*, fig. 1; and Figure 3, a vertical section, corresponding with fig. 1, of a modified form of the furnace.

Like letters designate corresponding parts in all of the figures.

The object of my invention is to thoroughly remove sulphur, phosphorus, arsenic, and other noxious substances, from ores, with economy, so that ores containing such ingredients, after treatment by my improved process, may be successfully reduced to their metallic bases in a pure state.

Three important results are attained by the construction of this furnace: first, a high degree of heat is secured with economy in fuel; second, an excess of oxygen, the desulphurizing agent, is presented to all parts of the mass of ore without detracting from the the temperature; third, the ore, when sufficiently treated, is readily removed from the furnace without obstructing the continuous operations in the treatment of succeeding charges of ores.

Let A represent the interior or ore-treating chamber; B C, the fire-chambers; and D, the hearth of the furnace. The width of the chamber A between the fire-chambers should not be so great as not to allow a complete circulation of the heated air into the center of the mass of the ore.

First, the fire-chamber B, on one side, is located just above the upper edge of the inclined hearth D, opposite to the side where the treated ore is drawn out at the door *g*, and the fire-chamber C, on the opposite side, is located at a higher level than the chamber B, so as to give sufficient room below for taking out the ores, and in order to more easily and effectually distribute the heat and air of the blast to the ore. The arrangement is substantially represented in fig. 1.

Second, the hearth D is inclined from below the lower fire-chamber B downward to the door *g*, where the ore is drawn out after treatment. This inclination of the hearth from one side to the other enables the treated ore, as it settles to the bottom, to be removed equally from the middle and both sides. It also furnishes a chamber or reservoir, *a*, at the bottom of the main ore-chamber A, into which the ore, as it becomes completely desulphurized or treated, settles below the furnaces, wherein it can partially cool before being removed. Instead of the singly-inclined hearth and fire-chambers at different heights, as shown in fig. 1, an arrangement indicated in fig. 3 may be adopted. Here the hearth D inclines both ways to two doors, *g g*, (or more inclinations if more doors are used,) for removing the ore, and both (or all, if more than two are used,) the fire-chambers B C are at the same height, at least entirely above the highest part of the hearth, so that a chamber or chambers is furnished below the fire-chambers, as in the first-described arrangement.

Third, air is introduced into the ore-chamber through the hearth D, or near the same, at the side or sides of the furnace, or at least below the fire-chambers, by a pipe or pipes, *h*, or equivalent means, so that it is heated by the cooling ore on the hearth, whereby, in turn, the ore is assisted in cooling. Thus, also, the air is introduced into the ore undergoing treatment without first passing through the fuel, which would deprive the air of its oxygen, and thus prevent its becoming a desulphurizing agent, and thereby acting in the most efficient manner for desulphurizing the ore at the moment of being itself decomposed.

Fourth, besides the introduction of air as a desulphurizing agent through the desulphurized ore in the cooling-chamber or reservoir, atmospheric air is introduced into the ore through the fire-chambers B C, each of which has one or more pipes or passages, *d*, extending from the air-chamber *b*, below the fire-grate, into the space *c* above the fuel, or directly from the blast-pipe to the said upper space or chamber *c*, through which the air is conducted in excess above the fire without being decomposed in the fuel, and is then forced or passed in a heated state into the mass of ore by the pressure from the blast-pipe *f*, which leads into the air-chamber below the fire, or without such pressure.

The pipe or passage *d* is controlled by a valve, so as to regulate the amount of free air thus admitted into the furnace, or cut it off entirely; and the air-pipe or passage *h* (one or more) is, or may be, also, provided with a valve to regulate or cut off the flow of air into the furnace through or near the hearth. Thus free air may be introduced into the ore either at or through the bottom of the furnace, or above the fire-chamber or chambers, or both, at the bottom and through the fire-chamber or chambers; or both may be cut off, as when first heating a charge of ore for treatment, or the amount and relative proportions of air at the different inlets may be regulated at pleasure. This regulated variation of the introduction of air is desirable, if not necessary, to the proper treatment of different kinds or qualities of ores, as well as in different stages of the process of desulphurization.

What I claim as my invention, and desire to secure by Letters Patent, is—

1. An ore-roasting furnace, constructed so as to introduce air in excess of that required for the combustion of the fuel, but regulated in quantity, into the ore, through the fire-chamber or chambers, over the fire or fires, so as to be heated thereby before passing through the ore, substantially as herein specified.

2. Introducing air in excess of that required for combustion, but regulated in quantity, into the ores, through the fire-chamber or chambers, over the fire or fires, so as to be heated thereby before passing through the ores, substantially as herein specified.

3. In ore-roasting-furnaces, one fire-chamber, arranged higher than the other, or another, substantially as and for the purpose herein specified.

4. An ore-roasting furnace, constructed to admit air through or at the bottom of the roasting-chamber, so as to hasten the cooling of the ore already roasted, and to be itself heated thereby, for the purpose herein set forth.

Specification signed by me this 18th day of July, 1870.

E. P. HUDSON.

Witnesses:
EDWARD YARDLY,
C. E. HUDSON.